(12) United States Patent
Yu et al.

(10) Patent No.: US 8,250,179 B2
(45) Date of Patent: Aug. 21, 2012

(54) SYSTEMS, METHODS, AND COMPUTER PRODUCTS FOR PROVIDING PODCASTS VIA IPTV

(75) Inventors: Ke Yu, Alpharetta, GA (US); Michael Branam, Lawrenceville, GA (US); E-Lee Chang, Mableton, GA (US); Timothy Weaver, Alpharetta, GA (US); Madhur Khandelwal, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 551 days.

(21) Appl. No.: 12/170,324

(22) Filed: Jul. 9, 2008

(65) Prior Publication Data
US 2009/0144795 A1    Jun. 4, 2009

Related U.S. Application Data

(63) Continuation of application No. 11/948,824, filed on Nov. 30, 2007, now abandoned.

(51) Int. Cl.
*H04N 7/173* (2006.01)

(52) U.S. Cl. .................. 709/219; 709/203; 707/999.01

(58) Field of Classification Search .................. 709/219, 709/203; 707/999.01
See application file for complete search history.

(56) References Cited

U.S. PATENT DOCUMENTS

| | | | |
|---|---|---|---|
| 2005/0197725 A1* | 9/2005 | Alexander et al. | 700/94 |
| 2006/0190616 A1* | 8/2006 | Mayerhofer et al. | 709/231 |
| 2006/0265503 A1* | 11/2006 | Jones et al. | 709/227 |
| 2007/0036303 A1* | 2/2007 | Lee et al. | 379/93.28 |
| 2008/0107102 A1* | 5/2008 | Kaufman et al. | 370/352 |
| 2008/0120668 A1* | 5/2008 | Yau | 725/110 |
| 2008/0165388 A1* | 7/2008 | Serlet | 358/448 |
| 2009/0024926 A1* | 1/2009 | Morotomi | 715/716 |
| 2009/0070305 A1* | 3/2009 | Gibbon et al. | 707/4 |
| 2009/0264111 A1* | 10/2009 | Bernard | 455/414.3 |

* cited by examiner

*Primary Examiner* — Wing Chan
*Assistant Examiner* — Kostas Katsikis
(74) *Attorney, Agent, or Firm* — Cantor Colburn LLP

(57) ABSTRACT

Systems, methods, and computer products for providing podcasts via Internet Protocol Television (IPTV) are disclosed herein. Exemplary embodiments include a network-based method for providing digital media podcasts. The method includes receiving a request to render at least one podcast on a communications device authenticated on an IPTV network, retrieving the at least one podcast from the IPTV network, and providing the at least one podcast to the communications device.

18 Claims, 4 Drawing Sheets

SYSTEMS, METHODS, AND COMPUTER PRODUCTS FOR PROVIDING PODCASTS VIA IPTV

CROSS-REFERENCE TO RELATED APPLICATION

This application is a continuation of U.S. patent application Ser. No. 11/948,824 filed Nov. 30, 2007, the disclosure of which is incorporated by reference herein in its entirety. The co-pending application is assigned to the same assignee as this application, AT&T Delaware Intellectual Property, Inc. of Wilmington, Del.

BACKGROUND

Exemplary embodiments generally relate to telecommunications, and more particularly, to systems, methods, and computer products for providing podcasts via Internet Protocol Television.

Internet Protocol Television (IPTV) is a digital television delivery service wherein a digital television signal is delivered to subscribers (and users of subscribers' devices) via a computer network infrastructure using the Internet Protocol. Typically, IPTV services are bundled with additional Internet services, such as Internet web access and voice over Internet protocol (VOIP). Subscribers may receive IPTV services via a computing device, such as a set-top box, that is connected to a television or display device for the reception of an audio/video signal. Used in conjunction with an IP-based platform, the set-top box allows for the subscribers to access IPTV based services and additional services that are integrated within the IPTV platform.

IPTV service platforms allow for an increase in the interactive services that may be provided to the subscribers. As such, the subscribers may have access to a wide variety of content that is available via the IPTV service or the Internet. For example, a subscriber may utilize interactive services via a set-top box to view IPTV content or access personal electronic messaging accounts via an Internet web browser. The IPTV infrastructure may also allow the delivery of a variety of audio/video content instantly to the subscriber.

In conventional cable and satellite based television delivery systems, the subscriber is limited to receiving audio/video content either by pre-determined programming content, such as network television, and/or cable stations, such as HBO®. Subscribers may also receive music and/or audio content through dedicated "music channels" and/or "news channels". However, a subscriber may wish to receive content independent of available dedicated channels. An example of such content includes podcasts. Podcasts may be digital media files containing content decipherable by a computer device. In conventional cable and satellite based television delivery systems, there are no solutions for providing individual digital media files to subscribers.

BRIEF SUMMARY

Exemplary embodiments include a network-based method for providing podcasts. The method includes receiving a request to render at least one podcast on a communications device authenticated on an IPTV network, retrieving the at least one podcast from the IPTV network, and providing the at least one podcast to the communications device.

Additional exemplary embodiments include a system for providing podcasts to an Internet Protocol-enabled device. The system includes a computer processing device and a podcast providing application executing on the computer processing device. The podcast providing application includes receiving a request to render at least one podcast on the Internet Protocol-enabled device, retrieving the at least one podcast from an IPTV network, and providing the at least one podcast to the Internet Protocol-enabled device. According to the system, the Internet Protocol-enabled device is authenticated on the IPTV network.

Further exemplary embodiments include a computer program product. The computer program product includes a computer readable medium having instructions for causing a computer to implement a method. According to exemplary embodiments, the method includes receiving a request to render at least one podcast on the Internet Protocol-enabled device, retrieving the at least one podcast from an IPTV network, and providing the at least one podcast to the Internet Protocol-enabled device. According to exemplary embodiments, the Internet Protocol-enabled device is authenticated on the IPTV network.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the claims set forth at the end of this specification.

BRIEF DESCRIPTION OF DRAWINGS

Referring now to the drawings wherein like elements are numbered alike in the several FIGURES.

Figure 1:
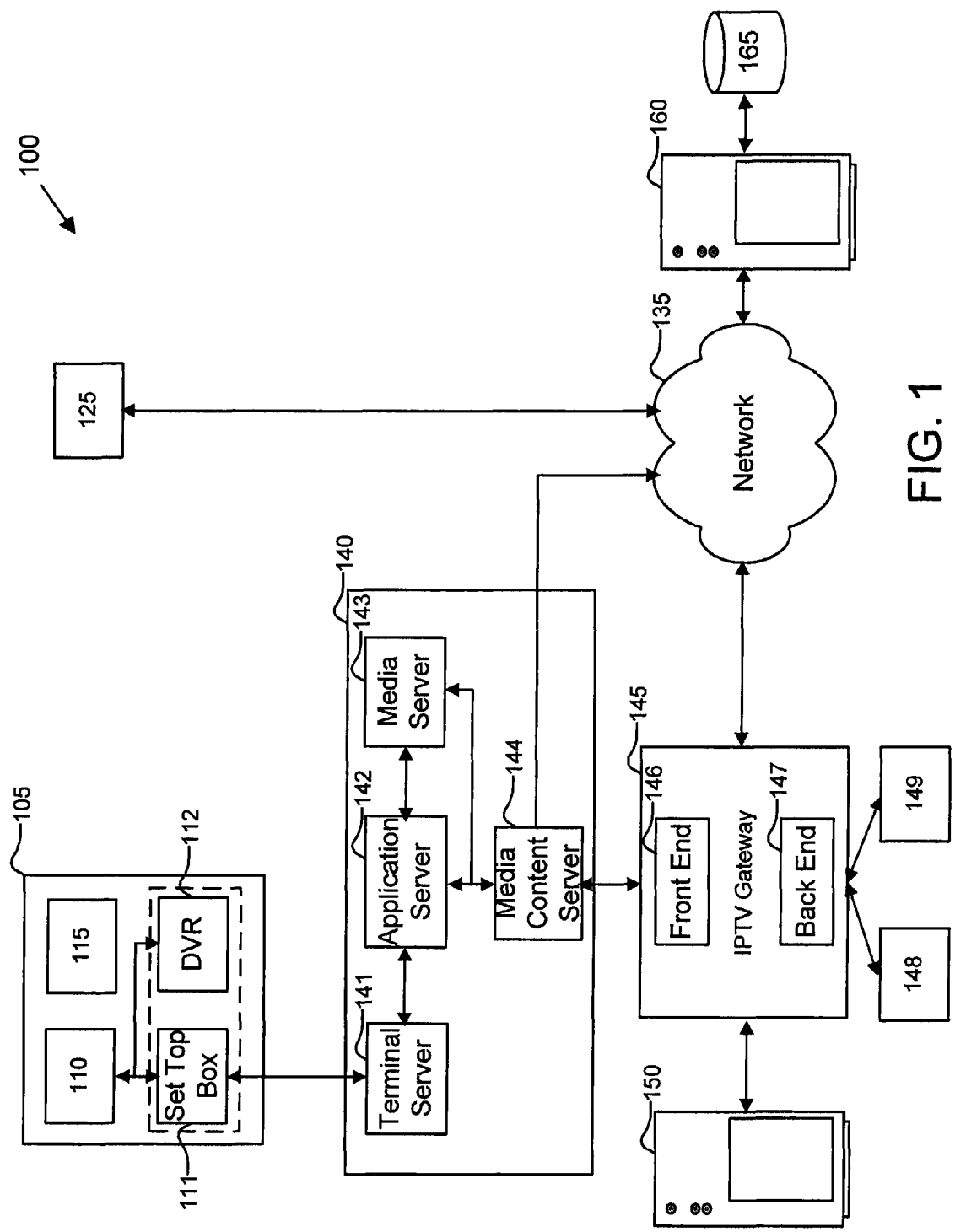
FIG. 1 illustrates a block diagram of a podcast providing system 100 in accordance with exemplary embodiments.

The detailed description explains the exemplary embodiments, together with advantages and features, by way of example with reference to the drawings.

DETAILED DESCRIPTION OF EXEMPLARY EMBODIMENTS

Detailed illustrative embodiments are discussed hereinafter. However, specific functional details disclosed herein are merely representative for purposes of describing exemplary embodiments. Exemplary embodiments may, however, be embodied in many alternate forms and should not be construed as limited to only the embodiments set forth herein.

Accordingly, while exemplary embodiments are capable of various modifications and alternative forms, particular embodiments are shown by way of examples in the drawings and will be described in detail herein. It should be understood, however, that there is no intent to limit exemplary embodiments to the particular forms disclosed, but to the contrary, exemplary embodiments are to cover all modifications, equivalents, and alternatives falling within the scope of exemplary embodiments. Like numbers refer to like elements throughout the description of the figures.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and similarly, a second step could be termed a first step, without departing from the scope of this disclosure. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In exemplary embodiments, systems, methods, and computer program products provide a subscriber and users of subscriber devices access to podcasts, the terms "subscribers'" and "users" being used interchangeably in the description that follows. The podcasts may be accessible with or without a fee payment by the subscriber. In exemplary embodiments, the subscriber is provided an interface which allows for selection of a plurality of different podcasts available on an IPTV network. The podcasts are selectable by the subscriber. If the subscriber accesses the interface and selects a podcast, the podcast may be streamed to the subscriber's location, for example, a set-top box, or be made accessible to the subscriber. The subscriber may access any podcast in the interface at any time. In exemplary embodiments, the interface contains pointers which provide access to the podcasts for streaming to the subscriber's set-top box. In other exemplary embodiments, the podcasts may be stored temporarily on the subscriber's digital video recorder, such as in a cache or memory. In addition, the subscriber may travel to another location that has access to the IPTV network, and if the user provides the correct authentication credentials, the user is able to access the podcasts from that location.

Turning to FIG. 1, a block diagram of an exemplary podcast providing system 100 is illustrated. For ease of illustration, the system 100 of FIG. 1 depicts a simplified network infrastructure. In addition, for ease of illustration, the system 100 is described as implementing an Internet Protocol Television (IPTV) system for reception of programming, scheduling, and IPTV-based services. It is understood that the systems and methods described herein may implement television and program-viewing systems other than IPTV. For example, the system 100 may implement cable, satellite, antenna, etc.

Furthermore, it is understood that a variety of network components/nodes may be utilized in implementing the embodiments described herein. For example, in exemplary embodiments, the system 100 includes a means for accessing network services for multiple disparate devices using a single sign-on procedure. The means for accessing network services may include one or more IPTV infrastructure(s) 140, IPTV gateways 145, and/or other suitable components/nodes. Therefore, the system 100 manages accounts, each of which may be established for a community of devices and/or device subscribers, such as those devices and subscribers at a subscriber location 105, which may include a communications device 110 (e.g., a display device or television) operatively connected to a computing device 111, such as a set top box. Where the communications device 110 is a television, the set-top box 111 may include a processor that provides bi-directional communications between the IPTV infrastructure 140 and the communications device 110 and decodes the streaming media received as content programming and onscreen programming information, from a content services provider system 160, discussed further below. Other services may be provided to the subscriber location 105, such as, but not limited to, phone services, network services and other services such as providing podcasts that may be received at the communications device 110. The accounts may thus include phone, network access, and IPTV services, and may be used to provide access to podcasts as described further herein. Furthermore, in exemplary embodiments, one of the devices (e.g., the communications device 110) may be provisioned for the network services described herein by associating a device identifier of the communications device 110 with a respective account. The account, in turn, identifies each of the communications devices belonging to the community and provides other information as described herein. Furthermore, it is appreciated that other devices, such as a subscriber computer 125, may be further included in the community of devices established for the subscriber location 105. It is appreciated that the subscriber computer 125 may be local to the subscriber location 105 or may represent any other computer that may be used to access the services described herein. It is further appreciated that other remote devices may be implemented to access the services described herein such as but not limited to a cellular telephone (e.g., a 3G cell phone), a personal computer, a laptop computer, a portable computing device (e.g., personal digital assistant), a digital music player (e.g., MP3 player), etc.

In exemplary embodiments, one of the devices, such as the communications device 110 (or the communication device 110 and set-top box 111 combination) may be used to establish account services, such as receipt of podcasts. An account record may be generated for the subscriber at the subscriber location 105, which identifies the subscriber and the account for which the services (e.g., basic account services as described above) may be billed to and/or for which invoice or account summaries may be transmitted to. Account information and records may be stored in a storage device accessible by the IPTV gateway 145, discussed below. In exemplary embodiments, the IPTV gateway 145 implements one or more applications for establishing and utilizing access to the account. Access to the account may thus be created for a community of communications devices (e.g., the communications device 110) to enable the communications devices to receive podcasts as described herein. A preferences server 150, which is coupled to the IPTV gateway 145, includes preferences information for the subscriber location 105 as described further herein.

As discussed above, the system 100 of FIG. 1 includes the subscriber location 105, such as the subscriber's household. The subscriber location 105 may include the communications device 110 (e.g., an IPTV-enabled television) in communication with the set-top box 111. The subscriber location 105 may further include a personal digital recorder, such as a digital video recorder (DVR) 112, which is in communication with the communication device 110 and the set-top box 111. It is understood that the set-top box 111 and the DVR 112 may be two separate devices or be a single integrated device 114. In exemplary embodiments, the DVR 112 may be hard-disk based, but may alternatively have other suitable storage media such as a cache or solid-state memory, or have a hard-disk and other storage medium combination. It is appreciated that the DVR 112 may have other suitable memory devices for receiving and storing programming and scheduling data. Therefore, a "memory" or "recording medium" may be any means that contains, stores, communicates, propagates, or transports the program and/or data for use by or in conjunction with an instruction execution system, apparatus or device. Memory and recording medium may be, but are not limited to, an electronic, magnetic, optical, electromagnetic, infrared, or semiconductor system, apparatus or device. Memory and recording mediums also include, but are not limited to, for example, the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

The subscriber location 105 may further include a remote control 115 for control and navigation of the communications device 110, which may be used to select and view videos or receive podcasts on the communications device 110. As discussed above, the subscriber location 105 may further include one or more remote devices in its community of devices. For example, the remote devices in the community of devices may include the subscriber computer 125. In exemplary embodiments, the subscriber computer 125 may be part of the subscriber location 105 or a computer that is accessed remotely in order to receive podcasts and control, manage, and/or schedule content from the content services provider system 160 transmitted to the subscriber location 105 for rendering on the communications device 110. It is therefore appreciated that access to podcasts may be managed from locations remote to the subscriber location 105. It is understood by those skilled in the art that the subscriber computer 125 may include input and output devices, such as but not limited to a mouse, a keyboard, etc. As discussed further below, the aforementioned devices may all interact with the IPTV infrastructure 140 and the IPTV gateway 145. It is appreciated that any of the aforementioned devices may access podcasts according to exemplary embodiments. Furthermore, in exemplary embodiments, the communications devices described herein may have a network address associated with the communications devices such as an addressable uniform resource locator (URL), an Internet address, etc.

In exemplary embodiments, the system 100 may manage and access podcasts through the subscriber's IPTV-enabled device, such as the communications device 110, via the set-top box 111, the remote devices (e.g., the subscriber computer 125, etc.) or any other suitable devices. As such, to coordinate IPTV communication, the system 100 may further include the IPTV gateway 145 that is in communication with the IPTV infrastructure 140. The IPTV infrastructure 140 and the IPTV gateway 145 are used in conjunction to communicate via a network 135. For example, a suitable device (e.g., the communications device 110) at the subscriber location 105 may direct the IPTV infrastructure 140 and the IPTV gateway 145 to communicate with the content services provider system 160.

The network 135 may be an IP-based network for communication between a content services provider system 160 and the subscriber location 105 using communication devices such as but not limited to the communications device 110 (via the set-top box 111, for example). The network 135 may be implemented to transmit content from the content services provider system 160 to the subscriber location 105 via a broadband connection, for example. In exemplary embodiments, the network 135 may be a managed IP network administered by a service provider. The network 135 may also be implemented in a wireless fashion, e.g., using wireless protocols and technologies, such as Wi-Fi, Wi-Max, etc. The network 135 may also be a cellular communications network, a fixed wireless network, a wireless local area network (LAN), a wireless wide area network (WAN), a personal area network (PAN), intranet, metropolitan area network, Internet network, the Internet, or other similar types of network environments or other suitable network systems. The network 135 includes equipment for receiving and transmitting signals. In other exemplary embodiments, the network 135 may be a circuit-switched network such as a standard public switched telephone network (PSTN), a packet-switched network, or any combination thereof.

In exemplary embodiments, the IPTV infrastructure 140 may be an IP-based network that receives network data (e.g., podcasts) from the content services provider system 160 and the preferences server 150, and delivers the network data to the set-top box 111 for receipt or rendering on the communications device 110. Alternatively, the network data may be for receipt or rendering on the subscriber computer 125 or other suitable device.

In exemplary embodiments, as discussed above, the IPTV infrastructure 140 provides an interface between the subscriber location 105 and the IPTV gateway 145. In exemplary implementations, a terminal server 141, an application server 142, a media server 143, and a media content server 144 operate to interface communication between the subscriber location 105 via the set-top box 111, and the IPTV gateway 145. For example, in exemplary implementations, the set-top box 111 may provide a unique identification number so that the IPTV gateway 145 may route network data to the set-top box 111. The network data may include a podcast, and may be routed to the set-top box 111 according to the operations of the IPTV infrastructure 140 described below.

According to exemplary embodiments, the media content server 144 may operate to acquire podcasts and/or other similar content from the content services provider system 160. For example, the media content server 144 may search for podcasts or other similar content on the content services provider system 160. The media content server 144 may search for new or newly listed content, or simply search for all available content on the content services provider system 160. Upon searching the content services provider system 160 for content, the content may be transmitted to the media content server 144 (e.g., over the network 135 and/or the IPTV gateway 145). The media content server 144 may ingest the content to create a podcast or content listing. For example, the media content server 144 may transcode content received from the content services provider system 160 into a format suitable for playback/access on the IPTV infrastructure 140. Upon transcoding, or at substantially the same time as transcoding, the media content server 144 may create a podcast or content listing and make the listing available to the application server 142 and the media server 143. Further, the actual transcoded content or podcasts may be transferred to the media server 143 for access/playback on the IPTV infrastructure 140.

It is noted that according to at least one exemplary embodiment, podcasts may be transcoded from any format (e.g., MP3 format, MPEG format, or any other format) on the content services provider system 160 to WINDOWS MEDIA AUDIO (WMA) format. WMA format is an audio data compression technology developed by MICROSOFT®, and WMA may be used to refer to a MICROSOFT® audio file format or a MICROSOFT audio codec that forms part of the WINDOWS MEDIA framework. Furthermore, according to at least one exemplary embodiment, podcasts may be transcoded from any available format (e.g., MP3 format, MPEG format, or any other format) on the content services provider system 160 to WINDOWS MEDIA VIDEO (WMV) format. WMV format is an audio/video data compression technology developed by MICROSOFT®, and WMV may be used to refer to a MICROSOFT® video file format or a MICROSOFT® video codec which forms part of the WINDOWS MEDIA framework and may include audio/video information, such as audio/video podcast audio information. Therefore, according to exemplary embodiments, podcasts may be provided in audio form (e.g., audio podcasts, mp3 files, etc) and video form (e.g., video podcasts, MPEG files, etc).

According to exemplary embodiments, the media server 143 may receive transcoded podcasts or content from the media content server 144. The transcoded content may be in a format suitable for playback on a communications device with access to the IPTV infrastructure 140 (e.g., communications device 110/set-top box 111 and/or subscriber computer 125). Furthermore, the application server 142 may receive a podcast or content listing from the media content server 144. The podcast or content listing may include a listing of all transcoded podcasts available for access/playback through the IPTV infrastructure 140. Further, the application server 142 may be operatively connected to the terminal server 141. Thus, the podcast or content listing may be available to the terminal server 141. The terminal server 141 may launch applications on a set-top box (i.e., the set-top box 111) and may display the podcast or content listing on the communications device 110 through the set-top box 111. Further, a subscriber may select podcasts from the podcast or content listing for playback on the communications device 110. Moreover, podcasts selected by the subscriber may be rendered on the set-top box 111 by the media server 143 for playback on the communications device 110. Thus, according to exemplary embodiments, the system 100 provides podcasts to the subscriber via IPTV.

In exemplary embodiments, the IPTV gateway 145 may further interface with the various system 100 elements as described herein. For example, the IPTV gateway 145 is in communication with the preferences server 150 to pass notifications and messages (e.g., email messages) regarding permissions to create and edit podcast access information. For example, different members of the subscriber location 105 who share account services may have different access schedules. For example, one member may have a unique access schedule and another member may have a second unique access schedule with little to no overlap with the first access schedule. As such, each member may retrieve and edit those different schedules and be properly authenticated to retrieve and edit those schedules.

In exemplary embodiments, the IPTV gateway 145 may include a back end 147 and a front end 146. The front end 146 may be used to implement various provisioning activities such as but not limited to initial provisioning of IPTV addresses for the devices at the subscriber location 105. The back end 147 may be implemented for many of the podcast providing services, such as communicating with the content services provider system 160, passing messages and notification to the IPTV gateway 145, etc. As such, the back end 147 may include various elements (e.g., 148, 149) including but not limited to a caller ID handler, Short Message Service (SMS) handler, message handler, provisioning handler, etc. It is noted, however, that more or less elements may be included depending upon any particular implementation. Therefore, exemplary embodiments should not be limited by the particular number of elements (i.e., 148, 149) illustrated.

In exemplary embodiments, the IPTV gateway 145 may implement authentication using a high-speed processing device (e.g., a computer system) that is capable of handling high volume activities conducted via communications devices, and other network entities (e.g., parts of the IPTV infrastructure 140, network 135, etc.) via one or more networks (e.g., an IPTV infrastructure 140). The IPTV gateway 145 receives requests from one or more devices from the subscriber location 105 to access network services, such as podcasts. The IPTV gateway 145 may implement authentication software for restricting or controlling access to network. The IPTV gateway 145 may be in communication with a customer identity system (CIS) database, which stores subscriber credentials (e.g., subscriber names and passwords) for access to IPTV services.

In exemplary embodiments, as discussed above, the system 100 further includes the content services provider system 160, which is in communication with the IPTV gateway 145 via the network 135. In exemplary embodiments, the content services provider system 160 is implemented by a host system (e.g., a high-speed processing device) that provides content to its subscribers (e.g., a subscriber of the communications device 110), such as television programs, premium programming services, video on demand content, and Internet/Web content (e.g., podcasts, streaming media, etc.). In exemplary embodiments, the content is transmitted to the subscribers (e.g., at the subscriber location 105) via a broadband connection over an Internet Protocol (IP)-based network (e.g., the network 135). The content services provider system 160 may also provide an onscreen programming guide to subscribers that provides information about current and future programming available via the content providers' services, such as podcasts that are to be available in the future. Programming information provided by the onscreen programming guide may include current and future program listings including but not limited to program titles, program producers, begin time, duration of program, a date in which the program was produced, and a brief text description of the program.

In exemplary embodiments, the content services provider system 160 is coupled to a database 165, which may include podcasts. In addition, the database 165 may include one or more playlists for available podcasts. Such playlist(s) may be used by the media content server 144 to search for podcasts or content. In exemplary embodiments, access to the database 165 and the associated communication between the database 165 and the media content server 144 may be implemented by exemplary methods described herein.

Figure 2:
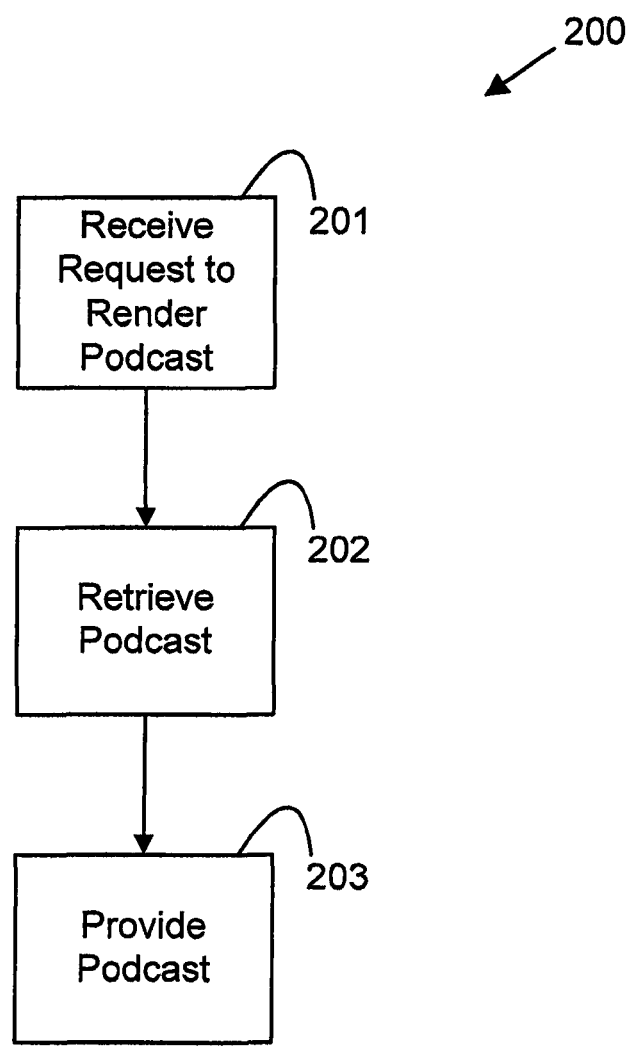
FIG. 2 illustrates a flow chart for a method of providing podcasts 200 in accordance with exemplary embodiments.

FIG. 2 illustrates a flow chart for a method of providing podcasts 200 in accordance with exemplary embodiments. As discussed above, a subscriber may interact with a communications device (e.g., the communications device 110) and select podcasts and other content to access. In step 201, a request to render at least one podcast may be received (e.g., audio/video podcast). The request may be received by a set-top box from a subscriber issuing a selection on a communications device, for example, the set-top box 111 and the communications device 110 discussed above. Furthermore, the request may be received by an IPTV infrastructure from a set-top box or remote station (e.g., the subscriber's computer 125, set-top box 111, IPTV infrastructure 140). The request to render the podcast(s) may be a request to render podcast(s) available to the IPTV infrastructure 140. The podcast(s) may be stored in a format decipherable by the IPTV network, and may be rendered on a communications device.

Further illustrated in FIG. 2, upon receipt of a request to render at least one podcast, step 202 includes retrieving the podcast(s) to render. For example, the IPTV infrastructure 140 may retrieve the podcast(s) from a storage device located therein. The storage device may be included within a media server (e.g., the media server 143). The podcast(s) may be retrieved from the media server 143 and made accessible to the set-top box 111. For example, as set forth in step 203, the podcast(s) is provided to the set-top box 111. Additionally, the podcast(s) may be streamed to the set-top box 111 as streaming audio/video from the media server 143. Upon receipt of the podcast(s) or streaming audio/video of the podcast(s), the set-top box 111 may render the podcast(s) on the communications device 110. Alternatively, the podcast(s) may be rendered on a remote computer (e.g., the subscriber computer 125) or other communications device. Hereinafter, a method of providing podcasts is described with reference to FIG. 3.

Figure 3:
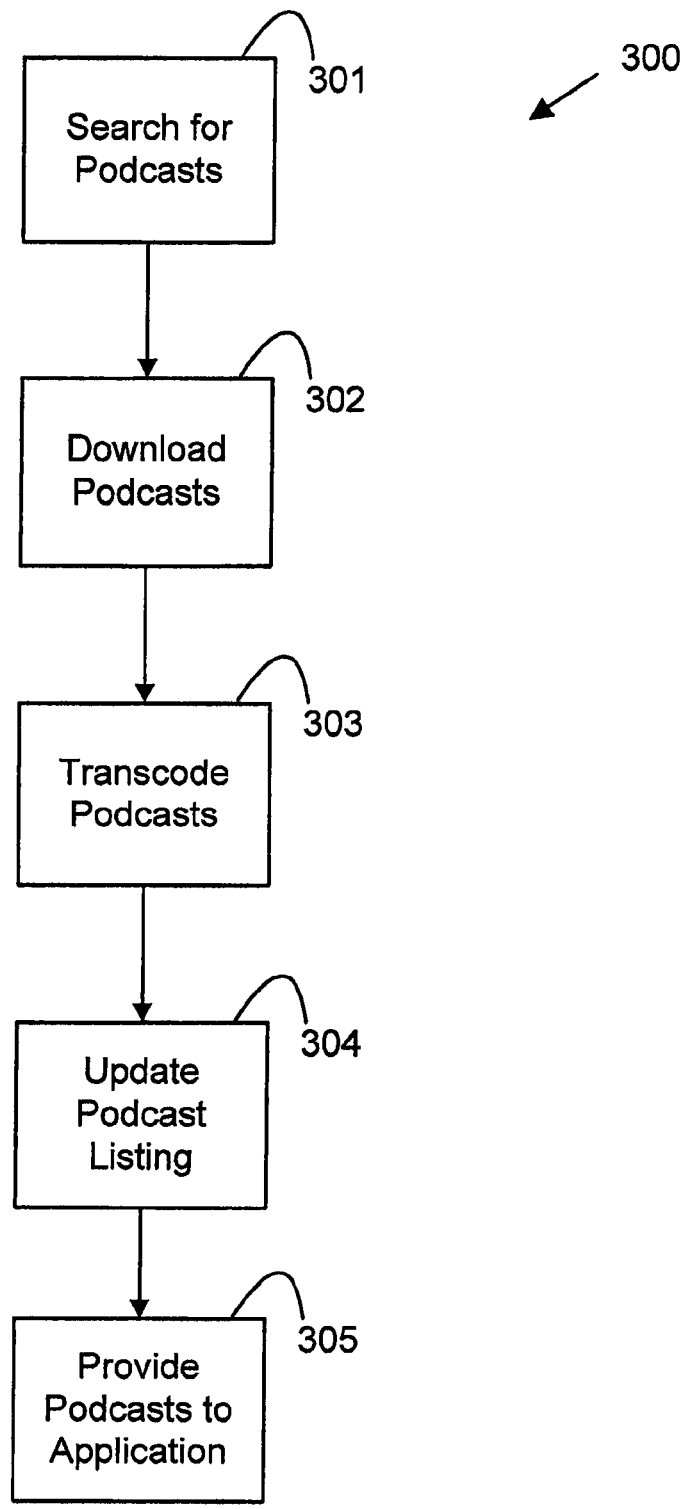
FIG. 3 illustrates a flow chart for a method of providing podcasts 300 in accordance with exemplary embodiments.

FIG. 3 illustrates a flow chart for a method of providing podcasts 300 in accordance with exemplary embodiments. As illustrated in FIG. 3, the method 300 includes searching for podcasts at step 301. For example, a media content server of an IPTV infrastructure may search a content services provider system for podcasts and/or other content. The media content server may be substantially similar to the media content server 144 of FIG. 1. The IPTV infrastructure may be substantially similar to IPTV infrastructure 140 of FIG. 1. Furthermore, the content services provider system may be substantially similar to content services provider system 160 of FIG. 1. It is further noted that the content services provider system 160 may be remote to the IPTV infrastructure 140, may communicate with the media content server 144 over a network, and may provide a listing or playlist of available content to the media content server. Therefore, the media content server 144 may search through the listing of available content to locate podcasts.

The method 300 further includes downloading podcasts at step 302. As discussed above, the media content server 144 may communicate with the content services provider system 160 over a network connection. Thus, the media content server 144, having identified podcasts available on the content services provider system 160, may download any podcast available on the content services provider system. The media content server 144 may download newly listed podcasts, most recently updated podcasts, podcasts of a particular type or category, all podcasts, or only podcasts selected by subscribers of an IPTV system including the IPTV infrastructure 140. For example, subscribers of the IPTV system may select podcasts they wish to access over a communications device (e.g., the communications device 110 or subscriber computer 125). The IPTV infrastructure 140 may thus download podcasts selected by the subscribers. Alternatively, the IPTV infrastructure 140 may download all podcasts or a sub-set of podcasts depending upon implementation. As exhaustive description of all possible combinations of download implementations is not the purpose of this disclosure, all such implementations are considered to be included within the scope of exemplary embodiments.

Turning back to FIG. 3, the method 300 further includes transcoding podcasts at step 303. For example, the media content server 144 may transcode content received from the content services provider system 160 into a format suitable for playback/access on the IPTV infrastructure. It is noted that according to at least one example embodiment, podcasts are transcoded from any format on the content services provider system 160 to WINDOWS MEDIA AUDIO (WMA) format. Furthermore, according to at least one exemplary embodiment, podcasts are transcoded from any available format on the content services provider system 160 to WINDOWS MEDIA VIDEO (WMV) format. Therefore, according to exemplary embodiments, podcasts may be provided in audio form (e.g., audio podcasts, mp3 files, etc) and video form (e.g., video podcasts, MPEG files, etc).

Turning back to FIG. 3, the method 300 further includes updating a podcast listing at step 304. For example, upon transcoding, or at substantially the same time as transcoding, the media content server 144 may create a podcast or content listing and make the listing available to an application server (e.g., the application server 142) and a media server (e.g., the media server 143). Further, the actual transcoded content or podcasts may be transferred to the media server 143 for access/playback on the IPTV infrastructure 140.

The method 300 further includes providing podcasts to an application at step 305. For example, a terminal server (e.g., the terminal server 141) of the IPTV infrastructure 140 may launch an application on a set-top box, such as the set-top box 111, or communications device, such as the communications device 110, of the subscriber. The application may include an interface or graphical user interface the subscriber can interact with. The application may include the methodologies disclosed herein, and thus may be a podcast providing application. The interface may be rendered on a communications device such as the communications device 110 of FIG. 1, and may be accessed through buttons or controls on the set-top box 111, or through a remote control (e.g., the remote control 115). The subscriber may use the interface to select a podcast to access. Alternatively, the subscriber may utilize a remote communications device, such as a PDA, portable music player, or other device to select a podcast. Further, a media server (e.g., the media server 143) of the IPTV infrastructure 140 may include a podcast selected by the subscriber. The media server 143 may thus provide the podcast to the subscriber, either by way of streaming audio/video to the application, or by any other means, including but not limited to, streaming to portable or remote communications device, downloading to the set-top box 111 and rendering on the communications device 110, or other similar means.

Therefore, as described above, exemplary embodiments include methods of providing podcasts via IPTV. The methods may include receiving requests to render at least one podcast, retrieving at least one podcast, and providing at least one podcast. The methods may further include searching for podcasts, downloading podcasts, transcoding podcasts, updating listing of available podcasts, and providing podcasts. It is noted that although exemplary embodiments of the present invention have been shown and described with regard to certain operations (e.g., method steps 201-203 of FIG. 2, and method steps 301-305 of FIG. 3) being performed serially or consecutively, it will be understood that any combination of these operations may be performed simultaneously and in parallel.

It is further noted that the methods above may be implemented by an podcast providing system similar to, or substantially similar to, system 100 of FIG. 1. However, exemplary embodiments should not be limited to only systems implemented with the particular components and/or connections depicted therein. For example, various components and/or connections may be included or not included for implementation of methods according to exemplary embodiments. Hereinafter, a screen shot of an exemplary podcast providing system interface is described with reference to FIG. 4.

Figure 4:
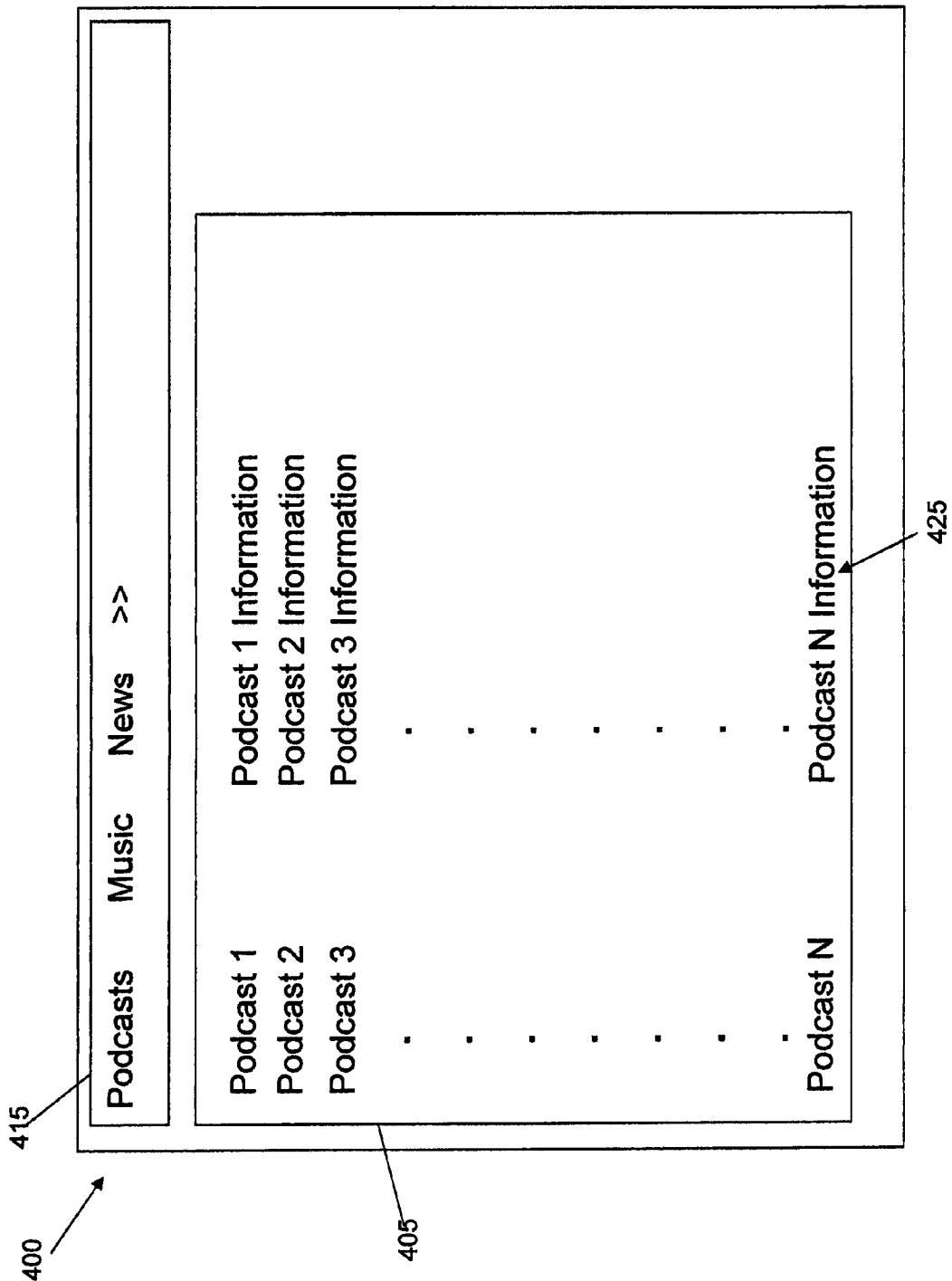
FIG. 4 illustrates a screen shot of an exemplary podcast providing system interface 400 in accordance with exemplary embodiments.

Turning to FIG. 4, the screen shot 400 of an exemplary podcast providing system interface, which may be accessed and displayed on a communications device (e.g., the communications device 110), or any of the other subscriber devices at a subscriber location is illustrated. As described above, the subscriber may select podcasts from a listing provided by the application launched by the IPTV infrastructure (e.g., the terminal server 141 of the IPTV infrastructure 140). In exemplary embodiments, the listing may be stored locally on the set-top box 111 or on the IPTV infrastructure 140, and be locally accessed to populate a listings field 405 on the interface 400. The listing may be periodically updated by an application server of the IPTV infrastructure 140 (e.g., the application server 142). In exemplary embodiments, the subscriber may search through the listing via a search field (not illustrated) or through scrolling manually through the listing. It is appreciated that there are various search methods known in the art that may be implemented for the search field. Furthermore, it is appreciated that scroll buttons may be included in the interface, or on the remote control 115 of the set-top box 111. The user may use a select key on the remote control 115 or a play button on the remote control to request rendering of the podcast or access to the podcast. It is appreciated that the subscriber may navigate the interface with the remote control 115 if the interface is displayed on the communications device 110. Alternatively, the subscriber may navigate the interface using a remote communications device such as a PDA, cell phone, etc. The subscriber may navigate through alternate listings of podcasts using display portion 415 (i.e., only music podcasts, news podcasts, etc), or through a complete listings of all podcasts available. Furthermore, the interface 400 may include a podcast information portion in the listing field 405 (see a portion 425) which includes information relating to individual podcasts. It is appreciated that the podcast information portion may display relevant information of all podcasts simultaneously, or may display information of a presently selected podcast. Furthermore, the information displayed for a podcast may include information from meta-data stored within the digital media file containing the podcast or information provided by a content services provider system. The information may include date of release, artist or author, content, etc.

The interface 400 may be rendered on a communications device (e.g., the communications device 110) of the IPTV infrastructure 140. Alternatively, the interface 400 may be included on a web-page remotely accessible using a remote communications device as noted above. The web-page may be provided by a server within the IPTV infrastructure 140, or a remote server used for web-serving to remote communications devices. The remote communications devices may be associated with the subscriber's account and/or location as discussed with reference to FIG. 1 above.

As described herein, exemplary embodiments of the present invention may be implemented, in software, for example, as any suitable computer program. For example, a program in accordance with one or more exemplary embodiments of the present invention may be a computer program product causing a computer to execute one or more of the example methods described herein directly on a host processor.

The computer program product may include a computer-readable medium having computer program logic or code portions embodied thereon for enabling a processor of the apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for example, in a computer, where instructions or functions may be executed directly on a host processor, in accordance with exemplary embodiments of the present invention. The carrier wave may be propagated over copper wire waveguides (e.g., coax or other cabling), optical waveguides (e.g., optical fiber), and may be implemented using any available protocol for carrier wave propagation. For example, in fiber-optic implementations, a fiber to the node (FTTN) or fiber to the premises (FTTP) implementation may be suitable. For example, in copper wire implementations, the carrier wave may be propagated through a digital cable infrastructure. Additionally, combinations of these examples may be used, such as a hybrid approach or Hybrid fibre-coaxial (HFC) implementations.

Further, such programs, when recorded on computer-readable storage media, may be readily stored and distributed. The storage medium, as it is read by a computer, may enable the methodologies described herein directly on a host processor, in accordance with the exemplary embodiments of the present invention.

Exemplary embodiments of the present invention being thus described, it will be obvious that the same may be varied in many ways. For example, the methods according to example embodiments of the present invention may be implemented in hardware and/or software. The hardware/software implementations may include a combination of processor(s) and article(s) of manufacture. The article(s) of manufacture may further include storage media and executable computer program(s), for example, a computer program product stored on a computer readable medium.

The executable computer program(s) may include the instructions to perform the described operations or functions. The computer executable program(s) may also be provided as part of externally supplied propagated signal(s). Such variations are not to be regarded as departure from the spirit and scope of the exemplary embodiments of the present invention, and all such modifications as would be obvious to one skilled in the art are intended to be included within the scope of the following claims.

What is claimed is:

1. A network-based method for providing podcasts, the method comprising:
   receiving a request to render a user selected podcast on a user communications device authenticated on an Internet Protocol television network;
   retrieving the user selected podcast;
   translating by a media content server of the Internet Protocol television network the user selected podcast from a podcast format to a format suitable for reception on the user communications device;
   searching a content provider system by the media content server for the user selected podcast, for podcasts of a particular category, and for podcasts of a particular type;
   downloading by the media content server the user selected podcast, the podcasts of the particular category, and the podcasts of the particular type;
   providing the user selected podcast to the user communications device; and
   causing by a terminal server a podcast application to be launched on the user communications device such that the user can select the user selected podcast from a podcast listing provided by the podcast application.

2. The method as claimed in claim 1, wherein the media content server is configured to translate the user selected podcast to the format suitable for reception on the user communications device.

3. The method as claimed in claim 1, wherein the media content server of the Internet Protocol television network is configured to create the podcast listing.

4. The method as claimed in claim 1, wherein the podcast listing provided by the podcast application is stored locally on the user communications device.

5. The method as claimed in claim 1, wherein the user communications device is an Internet Protocol-enabled television.

6. The method as claimed in claim 1, wherein the user selected podcast is provided to a communications device address of the user communications device.

7. The method as claimed in claim 6, wherein the user communications device address includes a uniform resource locator.

8. The method as claimed in claim 1, wherein the user communications device includes a set-top box.

9. A system for providing podcasts to a user Internet Protocol-enabled device, the system comprising:
   a computer processing device; and
   a podcast providing application executing on the computer processing device, the podcast providing application including:
   receiving a request to render a user selected podcast on the user Internet Protocol-enabled device, wherein the user Internet Protocol-enabled device is authenticated on an Internet Protocol television network,
   retrieving the user selected podcast;
   translating the user selected podcast from a podcast format to a format suitable for reception on the user Internet Protocol-enabled device;
   searching a content provider system for the user selected podcast, for podcasts of a particular category, and for podcasts of a particular type;
   downloading the user selected podcast, the podcasts of the particular category, and the podcasts of the particular type;
   providing the user selected podcast to the user Internet Protocol-enabled device; and
   causing a podcast application to be launched on the user Internet Protocol-enabled device such that the user can select the user selected podcast from a podcast listing provided by the podcast application.

10. The system of claim 9, wherein the podcast providing application further includes initiating an encoding session to translate the user selected podcast for reception on the user Internet Protocol-enabled device.

11. The system of claim 9, wherein the user Internet Protocol-enabled device is an Internet Protocol-enabled television.

12. The system of claim 9, wherein the user selected podcast is provided to a communications device address of the user Internet Protocol-enabled device.

13. The system of claim 12, wherein the communications device address includes a uniform resource locator.

14. The system of claim 9, wherein the user Internet Protocol-enabled device includes a set-top box.

15. A computer program product for providing podcasts to a user Internet Protocol-enabled device, the computer program product including a non-transitory computer readable medium having instructions for causing a computer to implement a method, the method comprising:
   receiving a request to render a user selected podcast on the user Internet Protocol-enabled device, wherein the user Internet Protocol-enabled device is authenticated on an Internet Protocol television network;
   retrieving the user selected podcast from the Internet Protocol television network;
   translating the user selected podcast from a podcast format to a format suitable for reception on the user Internet Protocol-enabled device;
   searching a content provider system for the user selected podcast, for podcasts of a particular category, and for podcasts of a particular type;
   downloading the user selected podcast, the podcasts of the particular category, and the podcasts of the particular type;
   providing the user selected podcast to the user Internet Protocol-enabled device; and
   causing a podcast application to be launched on the user Internet Protocol-enabled device such that the user can select the user selected podcast from a podcast listing provided by the podcast application.

16. The computer program product as claimed in claim 15, wherein the user Internet Protocol-enabled device is an Internet Protocol-enabled television.

17. The computer program product as claimed in claim 15, wherein the user selected podcast is provided to a communications device address of the Internet Protocol-enabled device.

18. The computer program product as claimed in claim 15, wherein the user Internet Protocol-enabled device includes a set-top box.

* * * * *